US006997238B1

(12) United States Patent
Ruthy et al.

(10) Patent No.: US 6,997,238 B1
(45) Date of Patent: Feb. 14, 2006

(54) COOLER PLATE AND GEARBOX ASSEMBLY

(75) Inventors: Michael C. Ruthy, Chippewa Falls, WI (US); Douglas W. Seitz, Eau Claire, WI (US)

(73) Assignee: W.S. Darley & Co., Melrose Park, IL (US)

( * ) Notice: Subject to any disclaimer, the term of this patent is extended or adjusted under 35 U.S.C. 154(b) by 20 days.

(21) Appl. No.: 09/794,870

(22) Filed: Feb. 27, 2001

(51) Int. Cl.
*F01M 5/00* (2006.01)

(52) U.S. Cl. .................. 165/41; 165/51; 165/80.5; 184/104.1; 180/339; 74/606 A

(58) Field of Classification Search .............. 165/41, 165/51, 47, 80.5, 73; 74/606 A, 467; 184/104.1; 180/339, 308
See application file for complete search history.

(56) References Cited

U.S. PATENT DOCUMENTS

| 1,318,706 | A |   | 10/1919 | Talbot ...................... 184/104.3 |
| 1,918,471 | A |   | 7/1933  | Hawkins .................... 123/41.33 |
| 2,591,168 | A | * | 4/1952  | Latham Jr, et al. ........... 165/49 |
| 3,189,126 | A | * | 6/1965  | May ........................ 123/195 R |
| 3,354,988 | A | * | 11/1967 | Leonard ................... 123/198 R |
| 4,111,618 | A | * | 9/1978  | Thibault .................... 180/308 |
| 4,423,708 | A | * | 1/1984  | Sweetland ................ 165/51 X |
| 4,607,601 | A | * | 8/1986  | Kohler ..................... 123/90.31 |
| 4,928,651 | A | * | 5/1990  | Kronich ................... 184/104.2 |
| 4,995,971 | A | * | 2/1991  | Droste et al. ............. 74/467 X |
| 5,018,407 | A | * | 5/1991  | Hoecht ..................... 74/467 X |
| 5,078,209 | A |   | 1/1992  | Kerkman et al. ........... 165/167 |
| 5,154,225 | A | * | 10/1992 | Armbruster et al. .......... 165/51 |
| 5,165,468 | A |   | 11/1992 | Tajima et al. ................ 165/47 |
| 5,203,832 | A | * | 4/1993  | Beatenbough et al. ..... 165/51 X |
| 5,411,116 | A | * | 5/1995  | Kish et al. ................ 74/467 X |
| 5,511,612 | A | * | 4/1996  | Tajima et al. ............. 165/51 X |
| 5,540,300 | A | * | 7/1996  | Downs et al. ......... 74/606 A X |
| 5,841,634 | A | * | 11/1998 | Visser .................... 165/80.5 X |
| 5,896,834 | A | * | 4/1999  | Gruner ..................... 123/41.33 |
| 5,927,384 | A | * | 7/1999  | Waldner, Jr. ................. 165/47 |
| 6,155,135 | A | * | 12/2000 | Gage et al. ............... 74/606 A |
| 6,202,736 | B1| * | 3/2001  | Fast ............................ 165/51 |
| 6,616,836 | B1| * | 9/2003  | Covington .................. 210/172 |
| 6,827,848 | B1| * | 12/2004 | Covington .................. 210/172 |
| 2003/0006085 | A1 | * | 1/2003 | Caldwell et al. ............ 180/339 |

OTHER PUBLICATIONS

Hale Fire Pump Company, Service Center Master Parts List and Drawing, 1989 Plate No. 649D, Gear Box Cooler, and Parts List, Sheet 2 of 3.
American Fire Pump Company, Maintenance Instructions for Barton-American Front Mounted Pumps, and Exploded View Drawing, Oct. 31, 1977 (8 pages).

* cited by examiner

*Primary Examiner*—Ljiljana Ciric
(74) *Attorney, Agent, or Firm*—Anthony J. Bourget

(57) ABSTRACT

A gearbox assembly comprising a casing defining a cavity for housing gears of an engine-driven apparatus, the casing having at least one substantially flat exterior surface for receiving a cooler plate, and a cooler plate mounted to the casing at the substantially flat exterior surface, the cooler plate isolated from the cavity by the flat exterior surface, the cooler plate having a channel for receiving a liquid for cooling the casing and at least one port in communication with the channel. At least one further embodiment includes a gearbox assembly where the channel is aligned with the exterior surface for supplying liquid in contact with the surface. The invention also includes a cooler plate for attachment at a closed exterior surface of a gearbox in order to supply cooling liquid in contact with the gearbox surface to cool the gearbox.

35 Claims, 9 Drawing Sheets

COOLER PLATE AND GEARBOX ASSEMBLY

FIELD OF THE INVENTION

This invention relates to a cooler plate, and more particularly to a cooler plate for use on a gearbox. The cooler plate is particularly useful in conjunction with a gearbox commonly used on fire engines.

DESCRIPTION—BACKGROUND OF PRIOR ART

Gearboxes, including those used on fire engines, encase various gears used for transferring mechanical power. A drive-shaft gear is often matched with one or more gears to operate various gear shafts. A typical gearbox for a fire engine may house gears from a drive shaft, an idler shaft, and a pump shaft. The gears within a sealed gearbox are surrounded with oil or other lubricant to reduce friction. Gearboxes are specially designed to encase the necessary gears, and are usually constructed of cast aluminum or iron and from a specially designed mold, resulting in a high cost item. During operation the transfer of mechanical power produces heat and friction within the gears, gearbox, and oil or other lubricant. Excessive heat within the gearbox, especially for prolonged periods, can be disastrous, resulting in breakdown of lubricant and failure of the gears, gear exchange, bearings, and gearbox. Thus various efforts have been made to reduce the heat within the gearbox.

One system for reducing the heat within the gearbox is to introduce a coolant source directly within the gearbox. Such system may include use of a copper tube inserted within the gearbox cavity. A coolant such as cool water or other cool liquid is pumped, sometimes continuously, through the copper tube which thereby cools the interior of the gearbox. However, such system requires insertion of copper tubing within the gearbox, and further requires that the cooling fluid be drained from the system for storage. Insertion of the copper tubing requires proper placement and fitting and occupies space within the gearbox. Failure to drain the copper tubing results in a bursting of the copper tubing in cold weather conditions, and may further cause extensive damage to the gears and destruction of the gearbox. If the copper tubing breaks, the gearcase fills with coolant and fails. Freezing is a special concern for fire pumps because many use plain water to cool the gearcase instead of a glycol/water (antifreeze) mixture.

Other systems used for cooling gearbox assemblies use techniques where the heated lubricant or oil is transferred to an external cooler for cooling and then circulated back to the gearbox. Such systems are often too complicated, expensive or inefficient for desired use. Accordingly, it is believed that it would be an improvement to provide a cooling apparatus for a gearbox which does not require insertion of any elements within the gearbox, including insertion of any copper tubing within the gearbox, or reoccurring draining of the coolant liquid. Moreover, it is believed that it would be an improvement to provide a cooling apparatus that effectively cools a gearbox without complicated, expensive or inefficient techniques.

BRIEF SUMMARY OF THE INVENTION

It is a principal object of the present invention to provide an apparatus for cooling of a gearbox. It is a further object of this invention to provide a cooler plate which may be mounted to a gearbox and which overcomes the limitations and shortcomings of the prior art.

The apparatus of the present invention provides for a cooler plate comprising a body having a channel for receiving cooling liquid. In a basic aspect, the invention provides the body with at least one port in communication with the channel, wherein cooling liquid may be inserted into the port and throughout the channel to cool the gearbox onto which the cooler plate attaches. In a further embodiment, the invention includes a gearbox assembly comprising a casing which defines a cavity for housing gears of an engine-driven apparatus. The casing has at least one substantially flat exterior surface for receiving a cooler plate. The assembly includes a cooler plate mounted to the casing at the substantially flat exterior surface. The cooler plate receives a liquid for cooling the casing.

In a further embodiment the invention includes a cooler plate suitable for attachment to a gearbox, the cooler plate having a top portion having a channel for receiving a cooling liquid, and a bottom portion defining at least one port in communication with the channel, wherein the cooling liquid may be inserted into the port and throughout the channel in order to cool the gearbox to which the cooler plate attaches.

In yet a further embodiment the invention includes a cooler plate for attachment to a gearbox of a firefighting apparatus. The cooler plate comprises a body having an exposed channel for receiving a cooling liquid, the body having at least one port in communication with the channel. Cooling liquid may be inserted into the port and throughout the channel to cool the gearbox onto which the cooler plate attaches.

In a further embodiment the invention includes a gearbox assembly for housing gears for transferring mechanical power. The gearbox assembly includes a casing having an exterior surface which includes a channel for receiving a cooling liquid. The casing receives a cover plate fitted over the channel for retaining the cooling liquid. The channel is exposed to open air when the cover plate is removed. Coolant is introduced to the channel through the cover plate to cool the gearbox.

The features, benefits and objects of this invention will become apparent to those skilled in the art by reference to the following description, claims and drawings.

DETAILED DESCRIPTION OF THE PREFERRED EMBODIMENTS

Figure 1:
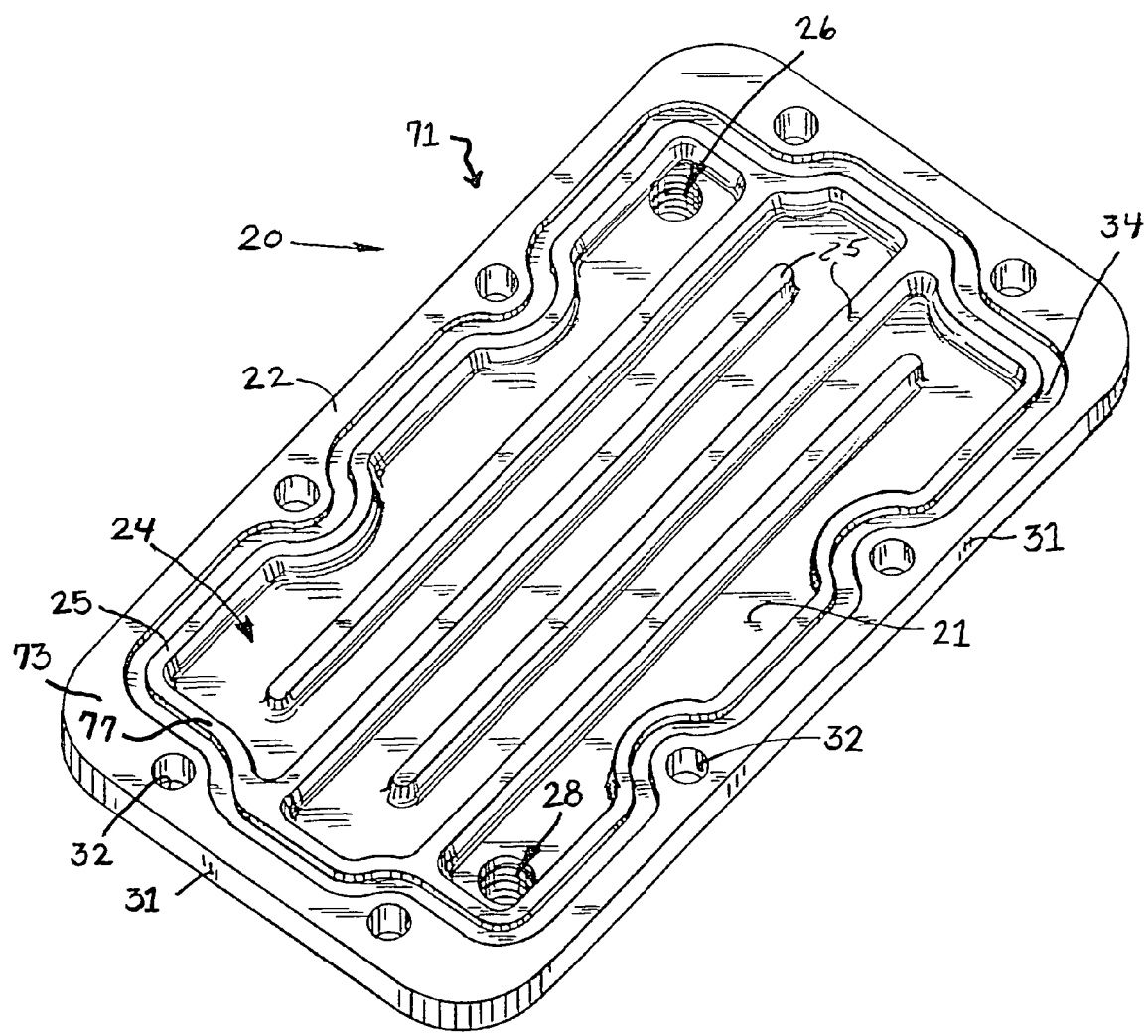
FIG. 1 is a perspective view of the cooler plate of the present invention.

In referring to the drawings wherein like numerals represent like parts throughout the several views, FIG. 1 represents a cooler plate 20. Plate 20 includes body 22 which is made from metal stock, preferably cast iron. Body 22 includes a channel 24 located at an upper side 21 of plate 20. Channel 24 receives a cooling liquid (liquid not shown). Channel 24 is exposed to open air while cooler plate 20 is not attached to gearbox 30. When cooler plate 20 is attached to gearbox 30 (see FIG. 2, FIG. 4) the cooling liquid directly contacts gearbox 30. For further clarification, body 22 includes first side 71 and second side 75 (See FIG. 1 and FIG. 4). First side 71 includes a first side face 73 which lies generally on a plane defined by face 73. Face 73 lies on a plane defining an upper-most portion of plate 20. Body 20 includes channel wall 25 which defines liquid receiving channel 24. At least a portion of liquid-receiving channel 24 is exposed to view from first side 71. As shown in FIG. 1, channel wall 25 includes channel wall face 77 which is generally flush with face 73 (i.e., lies along the plane defining an upper-most portion of plate 20).

The cooling liquid may be any type of coolant, including water, glycol or a mixture, water is preferable, however, especially since water is available on most engine systems. Body 22 further includes a port means for porting coolant such as insert port 26 and exit port 28. Insert port 26 and exit port 28 preferably include threads as shown in FIG. 1 for receiving fittings. Insert port 26 exit port 28 are preferably round shaped as shown, but other configurations could be employed. Channel 24 communicates with insert port 26 and exit port 28. Body 22 includes channel wall 25 which further defines channel 24. Channel 24 may be of any pattern, but is preferably a non-direct weaving route or path between insert port 26 and return port 28. A non-direct route causes cooling liquid to circulate about a greater surface area of a gearbox 30. Such route also exposes the cool water or other coolant to the gearbox surface for a longer period of time to thereby effect better heat transfer. It can be appreciated that alternate channel patterns may be employed, yet applicant has found the present to be preferable. Ideally the path is other than straight, and is indirect. Were channel 24 a direct path from insert port 26 to return port 28, or were inner channel walls 25 removed to create an open cavity, the water or coolant would tend to flow directly from insert port 26 to return port 28 thereby lessening the duration of water being present in plate 20. The configuration of channel 24 is intended to optimize the surface area about which coolant may constantly flow while simultaneously retaining such coolant in contact with gearbox 30 for as long as possible. Other configurations or paths for channel 24 may also suffice or be optimal. Channel 24 operates as a routing means to route the coolant about cooler plate 20. It is appreciated that other routing means for routing cooling liquid about the exterior surface of gearcase are available.

Body 22 further defines groove 34 which receives an O-ring 36 (see FIG. 3) for efficient sealing of plate 20 to gearbox 30. O-ring 36 inhibits coolant from leaking from plate 20. Groove 34 is preferably positioned near a perimeter of plate 20 as shown in FIG. 1. Channel 24 is preferably positioned within the boundary of groove 34.

Figure 2:
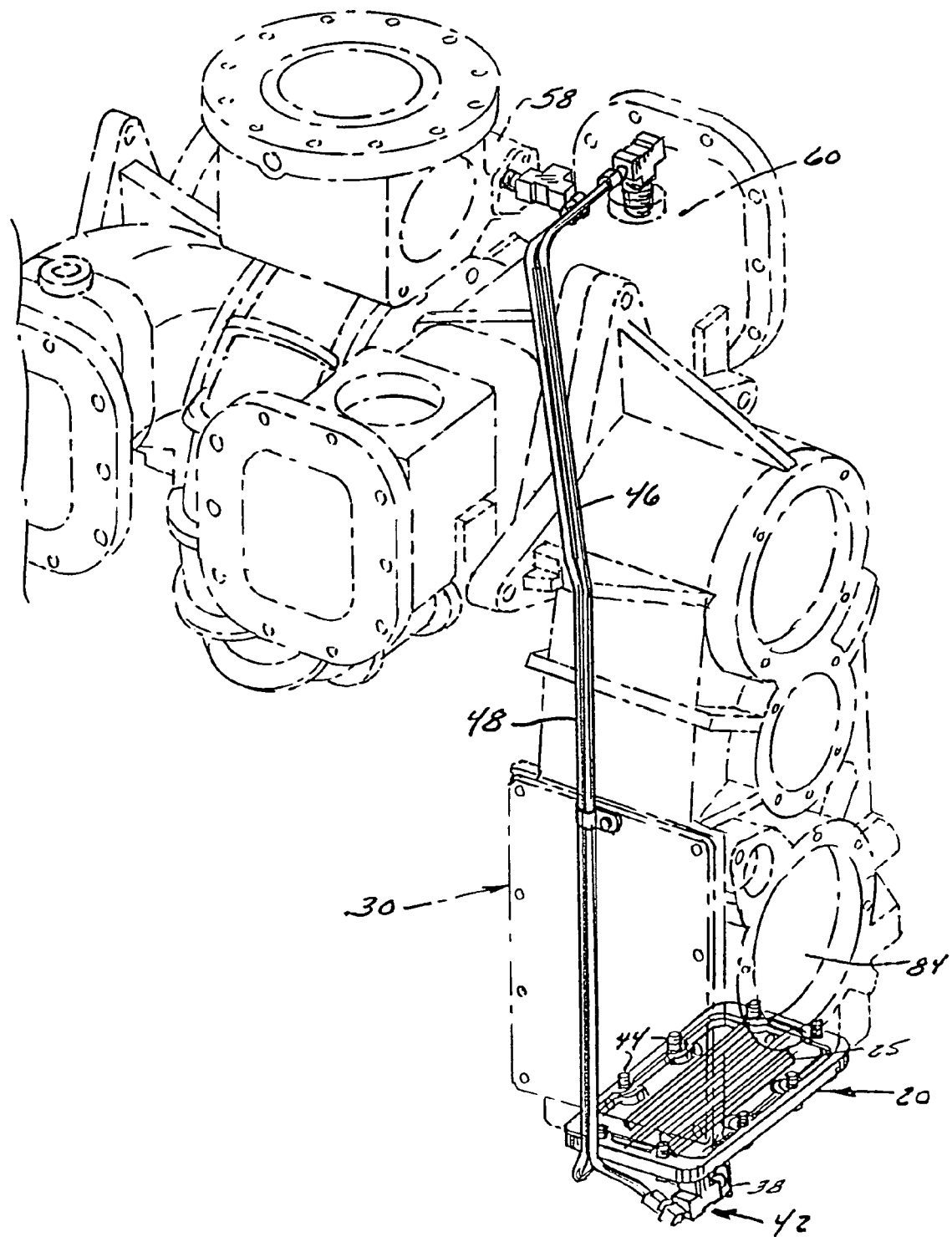
FIG. 2 is a perspective view of the cooler plate attached to a gearbox.

Plate 20 includes mounting means for mounting plate 20 to gearbox 30 as shown in FIG. 2. Mounting means includes apertures 32 for receiving bolts 44 for mounting into gearbox 30. It can be appreciated that cooler plate 20 can be mounted to gearbox 30 with any number of mounting means, including clamps, dips, screws, welds, or other fastening means. Washer locks 56 are used in conjunction with bolts 44. Cooler plate 20 has perimeter 31 and is substantially flat as shown in FIG. 1. Plate 20 mounts to a flat surface of a gearbox 30, thereby maintaining a relatively low profile. It can be appreciated that the thickness of plate 20 can vary, thus allowing for varying channel depths and volumes. As shown in FIG. 1, cooler plate 20 is substantially rectangular in shape, but may be of various configurations.

In operation, plate 20 is mounted to the exterior surface of gearbox 30. Coolant is supplied to plate 20 through insert port 26, circulates throughout channel 24, and exits through exit port 28. The coolant directly contacts gearbox 30. A continuous circulation of coolant can be maintained, thus allowing for efficient heat transfer or cooling of gearbox 30. In such operation, there is no insertion of items (such as cooling coils) directly into the gearbox 30.

While not preferable, an optional gasket (not shown) may be inserted between plate 20 and gearbox 30, to provide a liquid seal.

Figure 3:
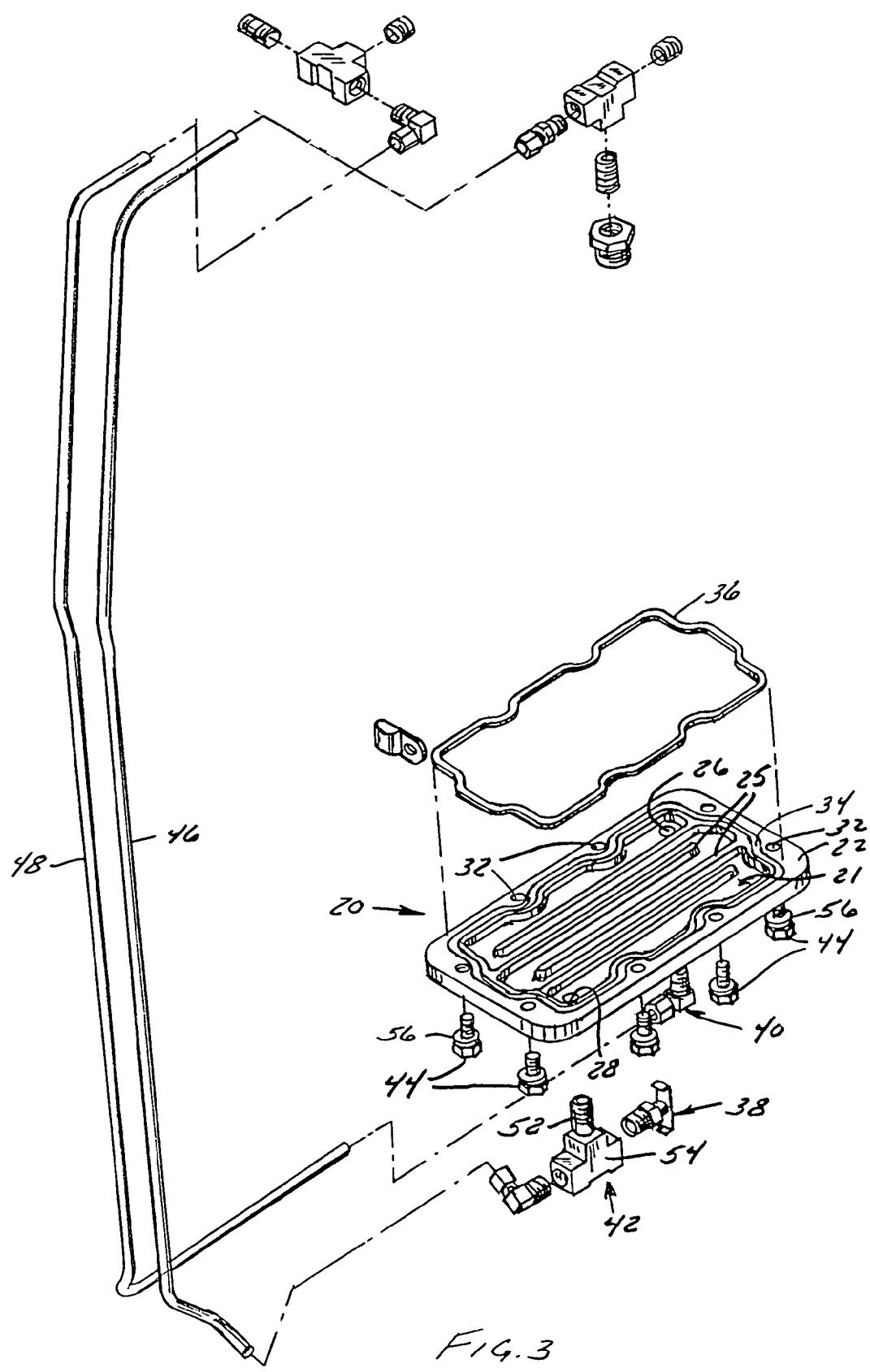
FIG. 3 is an exploded view of a cooler plate shown in FIG. 2.
Figure 4:
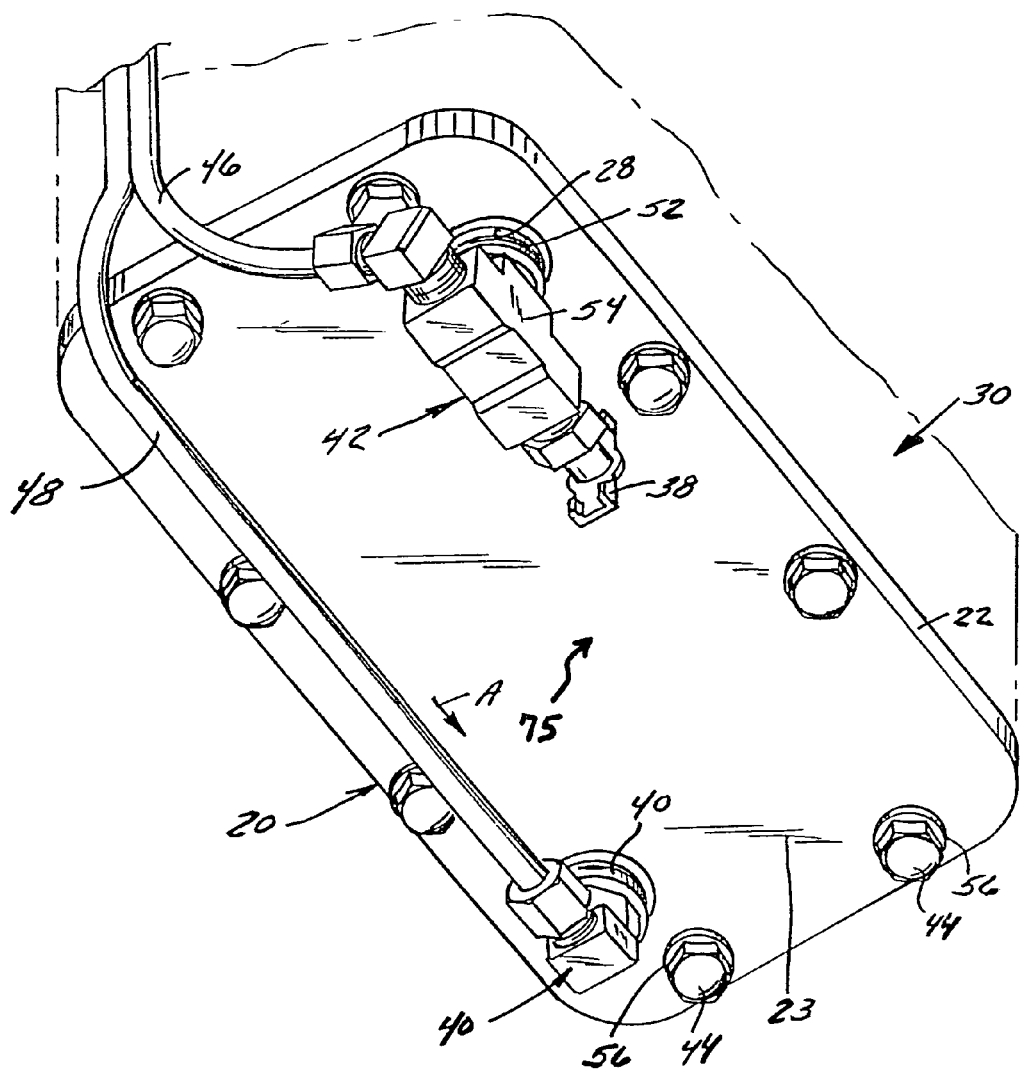
FIG. 4 is a bottom perspective view of the cooler plate shown in FIG. 2.

As shown in FIGS. 2 and 3, plate 20 is mounted to gearbox 30. Gearbox 30 is of a common variety for use in an apparatus where various gears and shafts interchange or connect. Gearbox 30 may also be a gearbox used on a fire truck or firefighting apparatus. Cooler plate 20 includes a liquid supply means for supplying liquid to insert port 26. Liquid supply means includes insert fitting 40. Additional supply means elements may include supply tube 48 which runs from water pump 58 and feeds plate 20 with coolant. Coolant flows into cooler plate 20 in direction A as shown in FIG. 4. Supply tube 48 connects to plate 20 at insert fitting 40 at a lower side 23 of the cooler plate 20 (See FIG. 4). Lower side 23 is generally substantially flat. Suction tube 46 runs from plate 20 to suction pump 60 and removes water or other coolant from plate 20. Suction tube 46 connects to plate 20 at exit fitting 42. Supply tube 48 and suction tube 46 can be made from many tube materials including but not limited to nylon and rubber tubes, and preferably from copper or plastic tubes. Exit fitting 42 includes drain valve 38 so that water or other coolant can be removed from plate 20. Exit fitting 42 includes nipple 52 (See FIG. 3) which inserts into exit port 28 for communication with channel 24. As shown, nipple 52 threads into exit port 28. Tee pipe 54 connects to nipple 52 and receives suction tube 46 and drain valve 38. Drain valve 38 operates to drain fluid from channel 24. Nipple 52 preferably threads within exit port 28.

If for some reason plate 20 were to fail, such as due to failure to open drain valve 38 after operation so that liquid remaining within channel 24 freezes and expands within plate 20 to cause cracking or warping of plate 20, then plate 20 may be easily replaced with a new plate and securely mounted to the gearbox. Rather than having failure result in expensive destruction or damage to the gearbox, the plate can be more easily and cheaply replaced or repaired. While plate 20 may be constructed from a variety of materials, it is preferably made from cast iron which allows plate 20 to hold its general shape.

Figure 8:
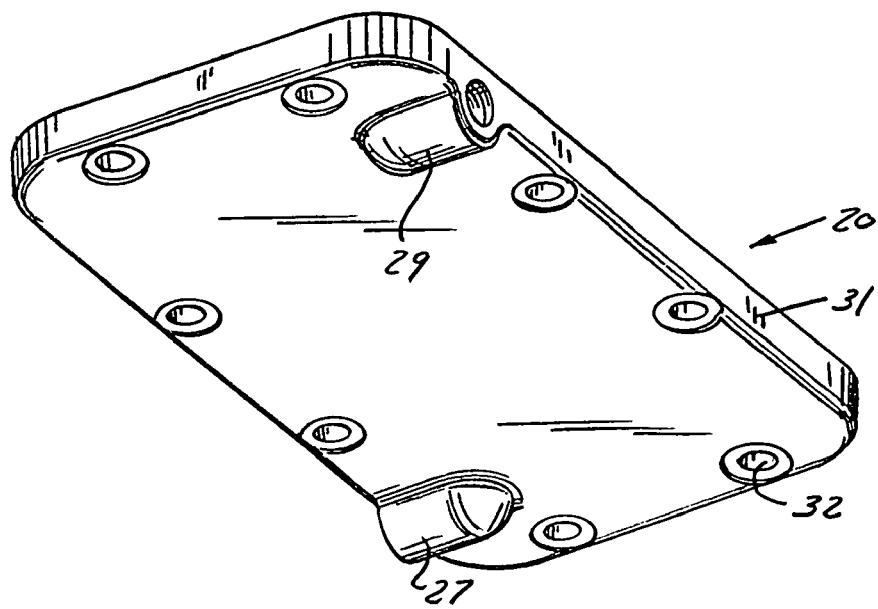
FIG. 8 is a bottom perspective view of a further embodiment of the cooler plate of the present invention.
Figure 9:
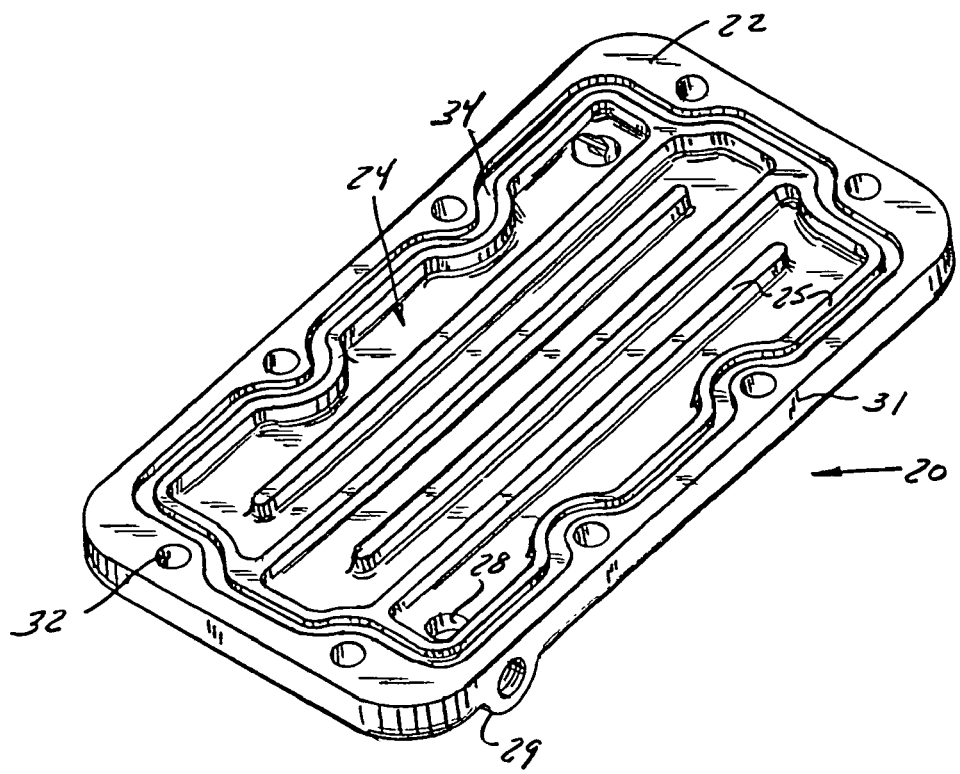
FIG. 9 is a perspective view of the cooler plate shown in FIG. 8.

In a further aspect of the present invention, plate 20 includes port means such as insert tunnel 27 and exit tunnel 29 as shown in FIGS. 8 and 9. Exit tunnel 29 communicates with exit port 28 so that coolant may exit plate 20. Insert tunnel 27 communicates with insert port 26 so that coolant may enter plate 20. Tunnels 27 and 29 are positioned to allow coolant to exit at perimeter edge 31. Such positioning allows for connection of liquid supply means at perimeter 31. This allows for lower profile configuration and ease of use and assembly. Tunnels 27 and 29 preferably have a hollow center and connecting threads as shown. Tunnels 27 and 29 are defined by plate 20 as shown in FIG. 8.

Figure 5:
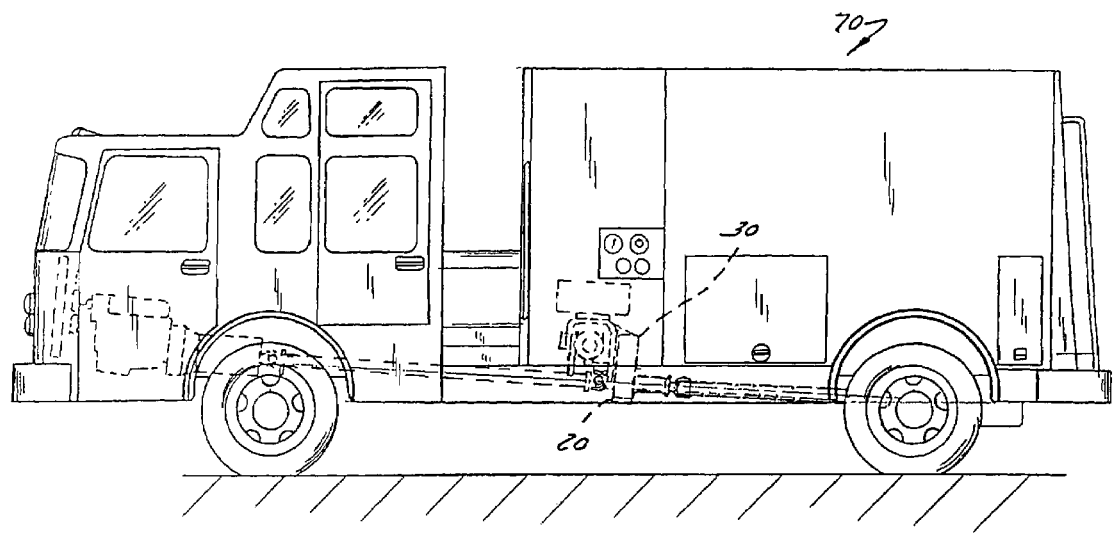
FIG. 5 is a side view of a fire engine equipped with the cooler plate attached to a gearbox.

FIG. 5 shows a firefighting apparatus 70 equipped with cooler plate 20 mounted to gearbox 30. This particular apparatus is a fire truck. It can be appreciated that the cooler plate may be equipped on gearboxes of other types of engine driven devices.

Figure 6:
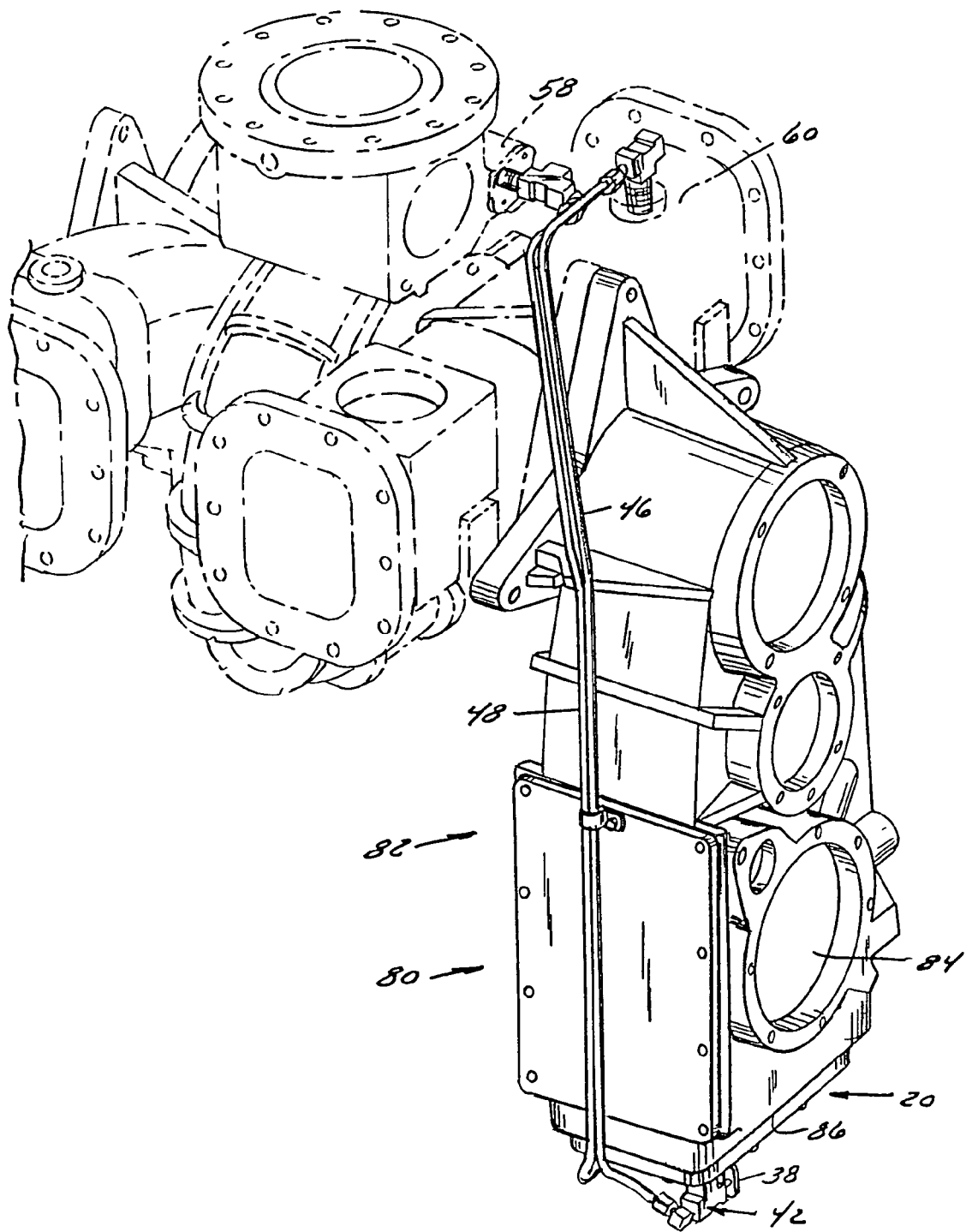
FIG. 6 is a perspective view of a gearbox assembly in accordance with a further embodiment of the present invention.
Figure 7:
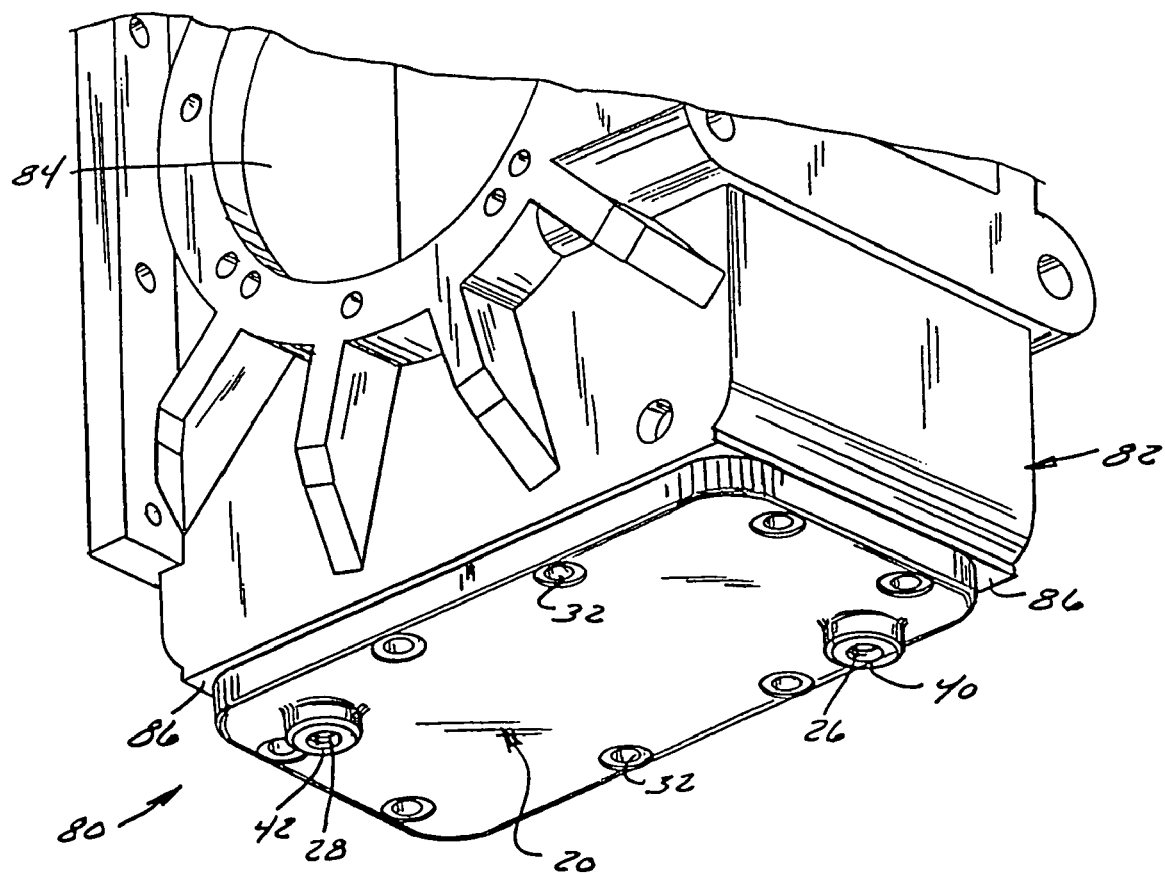
FIG. 7 is a bottom perspective view of the gearbox assembly in accordance with the present invention.

In a further embodiment of the present invention, a gearbox assembly 80 is shown in FIG. 6. Assembly 80 includes casing 82 which includes a cavity 84 for housing gears (gears not shown) of an engine-driven apparatus. Casing 82 has at least one substantially flat exterior surface 86. As shown in FIG. 7, flat surface 86 is located at a bottom portion of casing 82. It may be appreciated that a flat surface may also be located at other positions about casing 82 for receiving cooler plate 20. Cooler plate 20 attaches to casing 82 at the flat surface 86. Cooler plate 20 includes means for receiving a liquid for cooling the casing. Cooler plate 20 may include features as shown and described in the previous embodiments. The gearbox assembly 80 is particularly useful in operation with a firefighting apparatus, such as a fire truck.

It can be appreciated that the cooler plate of the present invention can be attached to a gearbox of a firefighting apparatus or to a gearbox of other equipment. The cooler plate may also be attached to other components in need of cooling.

Figure 10:
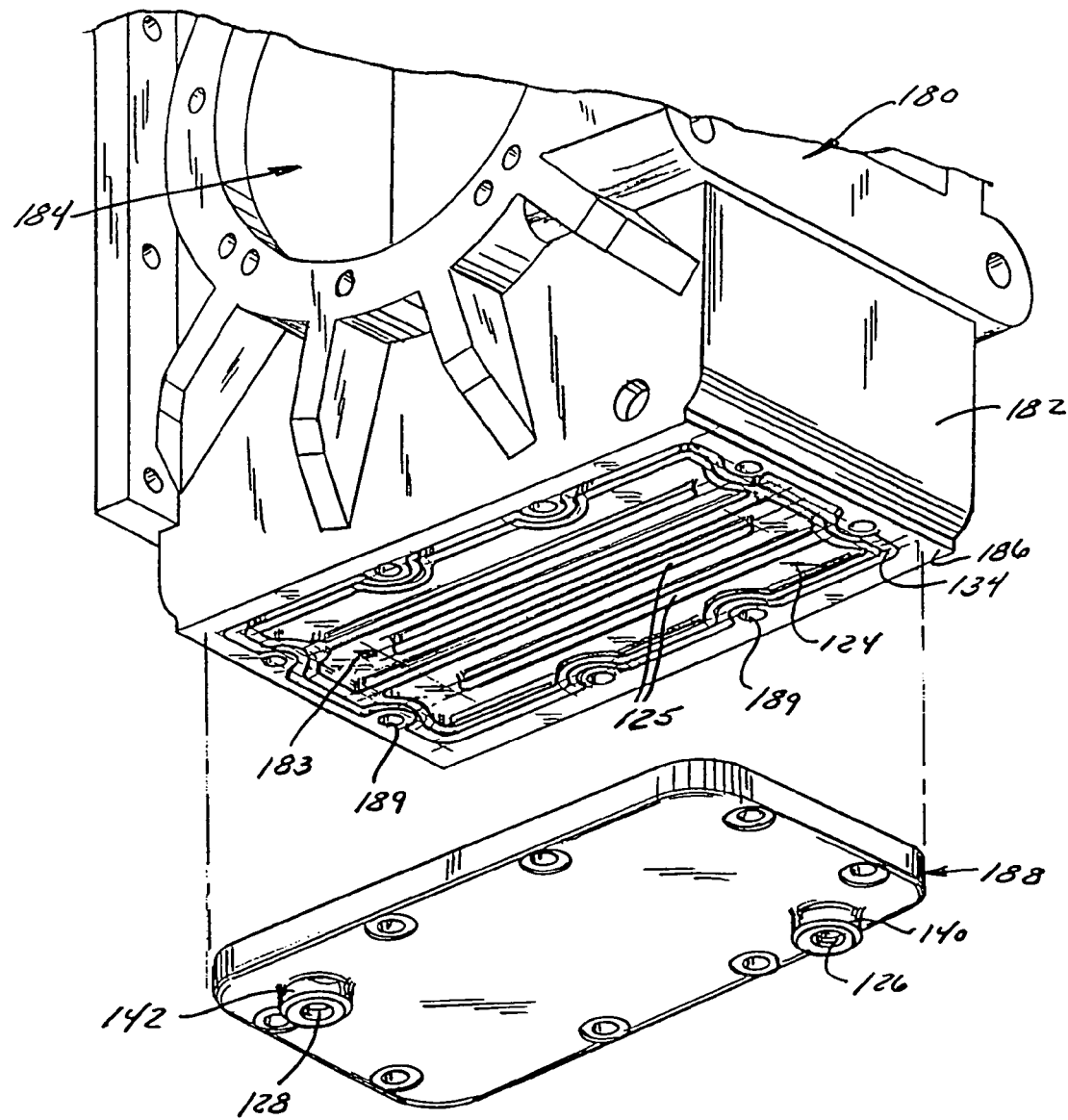
FIG. 10 is a bottom perspective view of a gearbox casing made in accordance with the present invention.

In a further embodiment of the invention, a gearbox assembly 180 is shown in FIG. 10. Assembly 180 includes casing 182 which includes a cavity 184 for housing gears (gears not shown) of an apparatus for transferring mechanical power. Casing 182 has an exterior surface 183 which includes a channel 124 for receiving a cooling liquid (liquid not shown). Channel 124 is preferably defined by surface 183. Casing 182 receives a cover plate 188 which fits over channel 124 for retaining the cooling liquid. Channel 124 is exposed to open air when cover plate 188 and any optional gasket (gasket not shown) is removed. Coolant is introduced to channel 124 through cover plate 188. Cover plate 188 includes insert port 126 and insert fitting 140 for receiving liquid. Coolant circulates through channel 124 in order to cool casing 182.

Channel 124 communicates with insert port 126 and exit port 128 defined in cover plate 188. Exterior surface 183 includes channel wall 125. Channel wall further defines channel 124. Channel 124 may be of any pattern, but is preferably a non-direct weaving route or path between insert port 26 and return port 28. Channel 124 operates as a routing means to route the coolant about the exterior surface 183. It is appreciated that other routing means are available.

Casing 182 may include sealing means. Sealing means may include groove 134 which receives an O-ring for efficient sealing of cover plate 188 to casing 182. It can be appreciated that groove 134 and O-ring may be contained in cover plate 188 to obtain similar sealing function.

Exterior surface 183 includes mounting means for mounting cover plate 188 to casing 182. Mounting means includes but is not limited to bolt mounts 189 for receiving bolts which extend through cover plate 188. Cover plate 188 is substantially flat. It can be appreciated that cover plate 188 may also include channel elements to mate with channel 124 for increased channel volume.

Gearbox assembly 180 may be used in conjunction with a firefighting apparatus or other engine driven mechanisms.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

We claim:

1. A cooler plate for attachment to an exterior surface of a gearbox in order to supply cooling liquid in contact with the exterior surface of the gearbox to cool the gearbox, said cooler plate comprising:
   a body having a first side and a channel wall, said channel wall defining a liquid-receiving channel for receiving the cooling liquid, said liquid-receiving channel having at least one direction-reversing turn, at least a portion of said liquid-receiving channel exposed to view from said first side, at least a portion of said channel wall comprising an upper-most portion of said cooler plate;
   an insert port in communication with said liquid-receiving channel and in communication with a side other than said first side; and
   an exit port wherefrom the cooling liquid exits said liquid-receiving channel;
   whereby the cooling liquid travels through said liquid-receiving channel in contact with the exterior surface of the gearbox to which said cooler plate attaches in order to cool the gearbox.

2. A cooler plate according to claim 1 wherein substantially all of said liquid-receiving channel is exposed to view at said upper side.

3. A cooler plate according to claim 1 wherein said cooler plate includes mounting means for mounting said cooler plate to the gearbox.

4. A cooler plate according to claim 3 wherein said mounting means includes an aperture defined by said body.

5. A cooler plate according to claim 1 wherein said liquid-receiving channel has at least two direction-reversing turns.

6. A cooler plate according to claim 1 wherein said body is made of cast iron and is rectangular in shape.

7. A cooler plate according to claim 1 wherein said body defines a groove positioned between said liquid-receiving channel and a perimeter of said cooler plate.

8. A cooler plate according to claim 7 wherein said cooler plate includes an O-ring which is received by said groove.

9. A cooler plate according to claim 1 wherein said cooler plate includes a drain valve for draining the liquid from said liquid-receiving channel.

10. A cooler plate according to claim 1 wherein said cooler plate includes liquid supply means for supplying cooling liquid to said insert port.

11. A cooler plate according to claim 1 wherein said body includes a second side and wherein said insert port is in communication with said second side.

12. A cooler plate according to claim 1 wherein said first side includes a first side face, wherein said channel wall includes a channel wall face, and wherein at least a portion of said channel wall face is flush with said first side face.

13. A cooler plate according to claim 12 wherein said channel wall and said first side face comprise an upper-most portion of said cooler plate.

14. A cooler plate according to claim 1 wherein said body includes an exit tunnel in communication with said exit port.

15. A cooler plate according to claim 1 wherein said body includes an insert tunnel in connection with said insert port.

16. A cooler plate for covering a substantially flat and closed portion of the exterior surface of a gearbox in order to cool the gearbox, said cooler plate comprising:
- a body having a first side and a channel wall, said channel wall defining an exposed-to-view channel for receiving a cooling liquid, said exposed-to-view channel having at least one direction-reversing turn, at least a portion of said channel wall comprising an upper-most portion of said cooler plate;
- an insert port in communication with said exposed-to-view channel; and
- an exit port wherefrom the cooling liquid exits said exposed-to-view channel;
- whereby the cooling liquid travels through said exposed-to-view channel in contact with the exterior surface of the gearbox of which said cooler plate covers in order to cool the gearbox.

17. A cooler plate according to claim 16 wherein said body has a second side defining said insert port.

18. A cooler plate according to claim 16 wherein said cooler plate includes mounting means for mounting said cooler plate to the gearbox.

19. The cooler plate according to claim 18 wherein said mounting means includes at least one aperture for receiving a mounting bolt.

20. The cooler plate according to claim 16 wherein said body includes an insert tunnel in communication with said insert port.

21. The cooler plate according to claim 16 wherein said body includes an exit tunnel in communication with said exit port.

22. The cooler plate according to claim 16 wherein said exposed-to-view channel has at least two direction-reversing turns.

23. A gearbox assembly, said assembly comprising:
- a casing defining a cavity housing gears of an engine-driven apparatus, said casing having at least one substantially flat exterior surface for receiving a cooler plate; and
- a cooler plate mounted to said casing at said substantially flat exterior surface, said cooler plate having a channel and at least one port in communication with said channel, said channel for receiving a liquid for cooling said casing, said channel having at least one direction-reversing turn, said channel in communication with said flat exterior surface, said channel isolated from communication with said cavity.

24. A gearbox assembly according to claim 23 wherein said cooler plate includes a return port in communication with said channel.

25. A gearbox assembly according to claim 23 wherein said channel includes at least two direction-reversing turns.

26. A gearbox assembly according to claim 24 wherein said cooler plate includes a drain valve for draining the liquid from said channel.

27. A gearbox assembly according to claim 24 wherein said cooler plate includes an exit tunnel in communication with said return port.

28. A gearbox assembly according to claim 23 wherein said cooler plate includes an insert tunnel in communication with said at least one port.

29. A gearbox assembly according to claim 23 wherein said cooler plate includes a substantially solid body having an upper side and a lower side, said channel defined by said upper side.

30. A gearbox assembly, said assembly comprising:
- a casing defining a cavity for housing gears of an engine-driven apparatus, said casing having at least one substantially flat exterior surface for receiving a cooler plate; and
- a cooler plate mounted to said casing at said substantially flat exterior surface, said cooler plate having a channel wall defining a channel, said channel for receiving and positioning a liquid in contact with said exterior surface for cooling said casing, said channel isolated from said cavity, at least one port in communication with said channel, said channel wall having at least one direction-reversing turn, at least a portion of said channel wall in contact with said exterior surface.

31. A gearbox assembly according to claim 30 wherein said cooler plate includes a return port in communication with said channel.

32. A gearbox assembly according to claim 30 wherein said channel wall has at least two direction-reversing turns.

33. A gearbox assembly according to claim 30 wherein said cooler plate includes an insert tunnel in communication with said at least one port.

34. A gearbox assembly according to claim 30 wherein said cooler plate includes an exit tunnel in communication with said channel.

35. A method of cooling a gearbox having a casing defining a cavity, said method comprising:
- providing a cooler plate having a first side and a channel wall, said channel wall defining a liquid-receiving channel for receiving a cooling liquid, said liquid-receiving channel having at least one direction-reversing turn, at least one port in communication with said channel;
- mounting said cooler plate to the casing of the gearbox while isolating said channel from the cavity and while positioning said channel in communication with the casing; and
- introducing liquid through said port in communication with said channel and in contact with the casing to thereby cool the gearbox.

* * * * *